United States Patent
Bekara

(10) Patent No.: US 9,310,504 B2
(45) Date of Patent: Apr. 12, 2016

(54) SYSTEMS AND METHODS FOR DETECTING SWELL NOISE IN A SEISMIC GATHER

(71) Applicant: PGS GEOPHYSICAL AS, Lysaker (NO)

(72) Inventor: Maiza Bekara, Surry (GB)

(73) Assignee: PGS GEOPHYSICAL AS, Oslo (NO)

( * ) Notice: Subject to any disclaimer, the term of this patent is extended or adjusted under 35 U.S.C. 154(b) by 542 days.

(21) Appl. No.: 13/757,669

(22) Filed: Feb. 1, 2013

(65) Prior Publication Data

US 2014/0219052 A1    Aug. 7, 2014

(51) Int. Cl.
*G01V 1/36* (2006.01)
*G01V 1/38* (2006.01)

(52) U.S. Cl.
CPC *G01V 1/38* (2013.01); *G01V 1/362* (2013.01); *G01V 1/364* (2013.01); *G01V 2210/21* (2013.01); *G01V 2210/3242* (2013.01); *G01V 2210/45* (2013.01)

(58) Field of Classification Search
CPC ....... G01V 1/3808; G01V 1/38; G01V 1/364; G01V 2210/32; G01V 1/36; G01V 1/362; G01V 2210/21; G01V 2210/3242
USPC .......................................................... 367/21
See application file for complete search history.

(56) References Cited

U.S. PATENT DOCUMENTS

| | | | |
|---|---|---|---|
| 5,818,795 A * | 10/1998 | Hawkins et al. | 367/21 |
| 7,382,682 B2 | 6/2008 | Zerouk | |
| 2002/0183931 A1 * | 12/2002 | Anno | 702/14 |
| 2006/0050612 A1 | 3/2006 | Zerouk | |
| 2012/0044782 A1 | 2/2012 | Bekara | |
| 2013/0182535 A1 * | 7/2013 | Hung | 367/24 |

FOREIGN PATENT DOCUMENTS

WO    02/21159 A2    3/2002

OTHER PUBLICATIONS

Anderson, Richard G., et al. "Automatic Editing of Noisy Seismic Data", Geophysical Prospecting 37, 1989, pp. 875-892.
Holcombe, H. Truman, et al., "Spatially Weighted Trim Stacking: A Technique for Prestack Noise Supression", SEG 1992, pp. 1157-1160.
Soubaras, Robert, "Signal-preserving random noise attenuation by the f-x projection", CGG, France, pp. 1576-1579.
Soubaras, Robert, "Prestack random and impulsive noise attention by f-x projection filtering", CGG, France, pp. 711-714.
Bekara, Maiza, et al., "High-amplitude noise detection by the expectation-maximization algorithm with application to swell-noise attenuation", Geophysics, vol. 75, No. 3 (May-Jun. 2010); pp. V39-V49.
Schonewille, Michel, et al, "Advances in swell noise attenuation", First Break, vol. 26, Dec. 2008, pp. 103-108.
Bekara, Maiza, et al., "Random and coherent noise attenuation by empirical mode decomposition," Geophysics, vol. 74, No. 5 (Sep.-Oct. 2009), pp. V89-V98.
European Search Report for Application No. 14153483.4-1559/2762926, dated Nov. 9, 2015.

* cited by examiner

Primary Examiner — Ian J Lobo

(57) ABSTRACT

Systems and methods for detecting swell noise in geophysical data are disclosed. In particular, the systems and methods receive seismic data as input and iteratively generate a signal mask from the seismic data. The seismic data can be generated by hydrophones or geophones. The signal mask can be used to identify traces in the seismic data that are contaminated with swell noise and identify frequencies of the contaminated traces that are contaminated with swell noise.

26 Claims, 16 Drawing Sheets

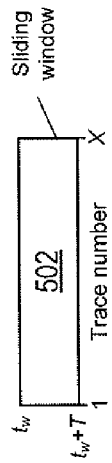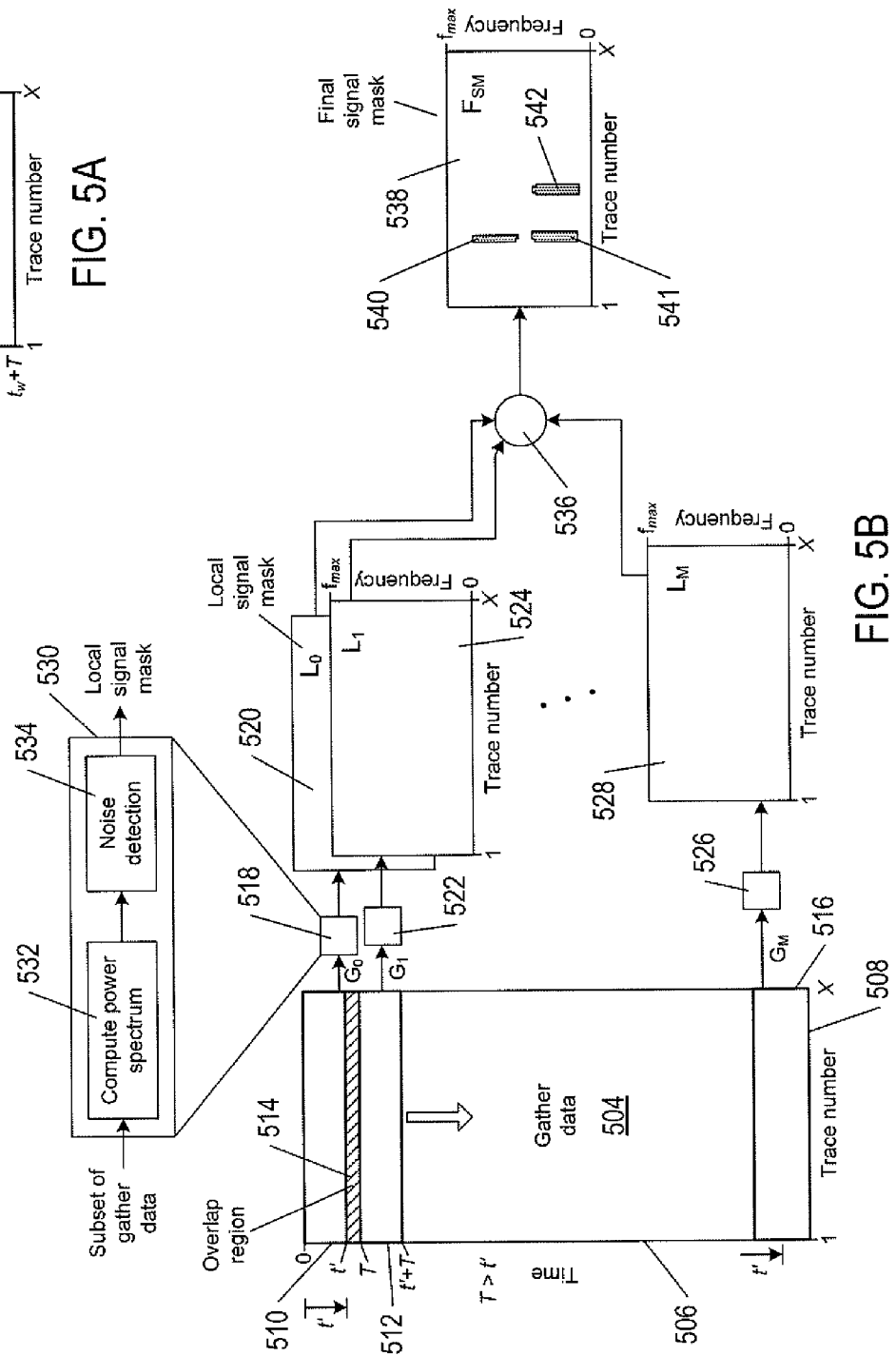

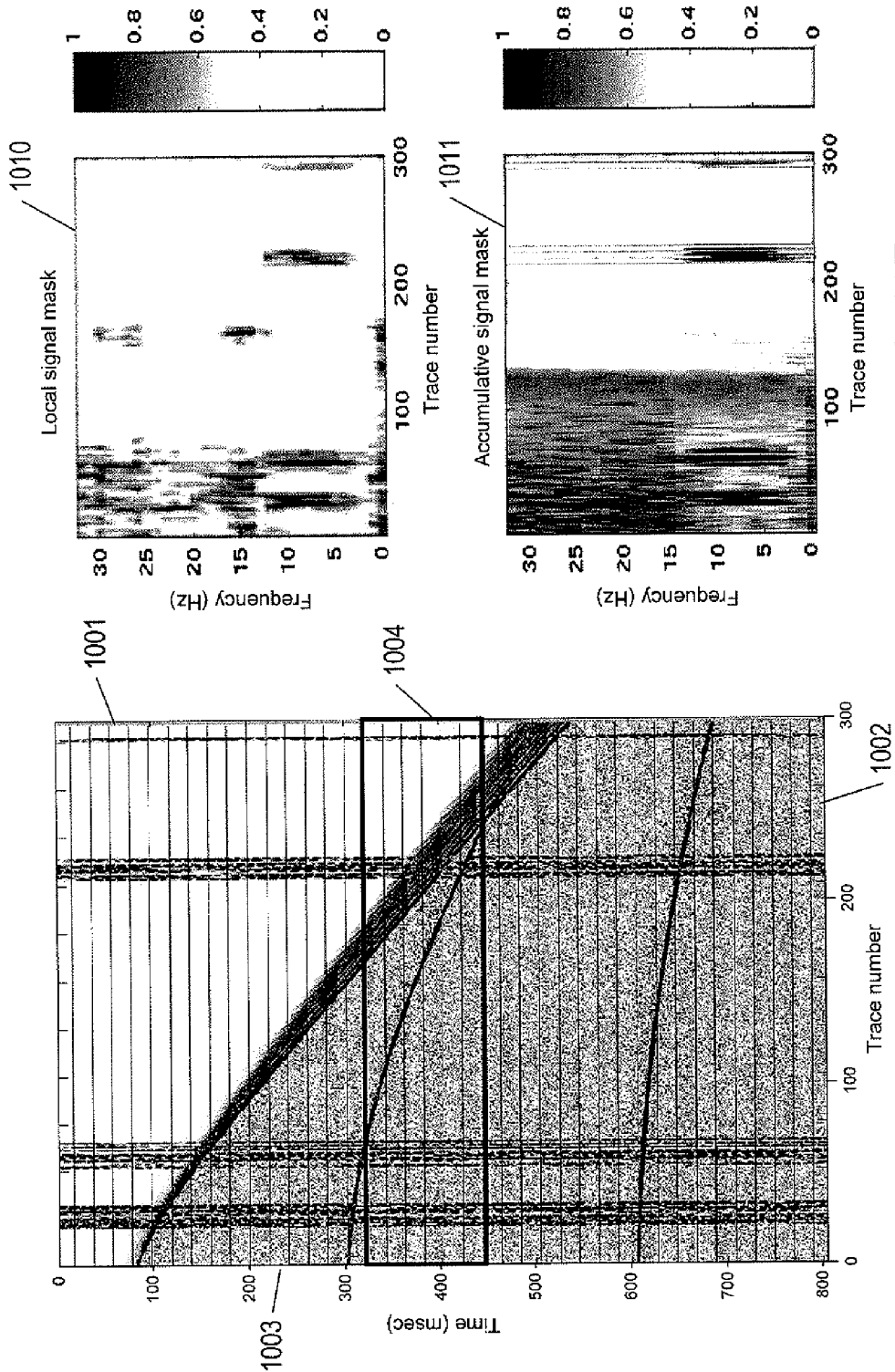

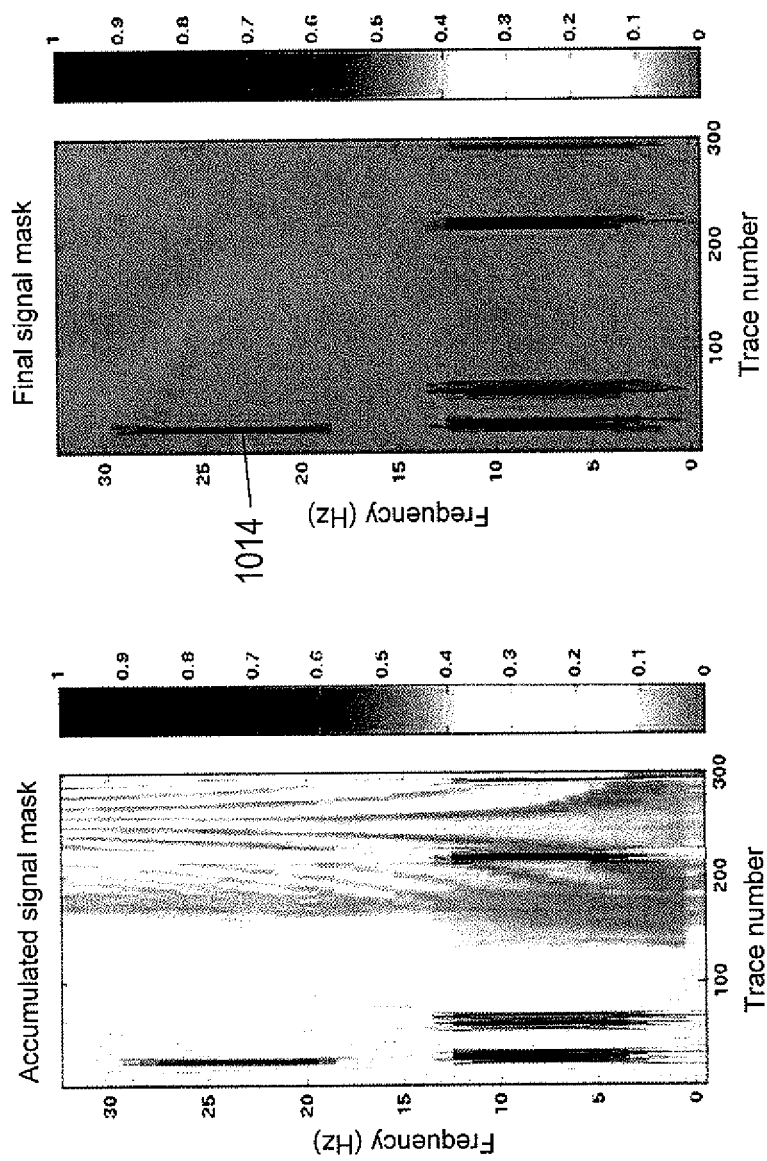

SYSTEMS AND METHODS FOR DETECTING SWELL NOISE IN A SEISMIC GATHER

BACKGROUND

In the past few decades, the petroleum industry has invested heavily in the development of marine seismic survey techniques that yield knowledge of subterranean formations beneath a body of water in order to find and extract valuable mineral resources, such as oil. High-resolution seismic images of a subterranean formation are essential for quantitative seismic interpretation and improved reservoir monitoring. For a typical marine seismic survey, an exploration-seismology vessel tows a seismic source and one or more streamers that form a seismic data acquisition surface below the surface of the water and over a subterranean formation to be surveyed for mineral deposits. The vessel contains seismic acquisition equipment, such as navigation control, seismic source control, seismic receiver control, and recording equipment. The seismic source control causes the seismic source, which is typically an array of source elements, such as air guns, to produce acoustic impulses at selected times. Each impulse is a sound wave that travels down through the water and into the subterranean formation. At each interface between different types of rock, a portion of the sound wave is refracted and another portion is reflected back toward the body of water to propagate toward the surface. The streamers towed behind the vessel are elongated cable-like structures. Each streamer includes a number of seismic receivers or sensors that detect pressure and/or velocity wavefields associated with the sound waves reflected back into the water from the subterranean formation.

Because marine surveys are traditionally conducted near the free surface of an open body of water, such as an ocean, sea, or lake, the survey data may be impacted by conditions at the water surface. For example, swell noise can be a significant problem in offshore surveys. Swell noise results from swells, which are a series of surface waves generated by rough weather conditions. Because swells have dispersed from their source, swells typically have a longer wavelength than local wind generated waves and occur as large-amplitude, low-frequency noise (e.g., between about 0-20 Hz) that can be observed in geophysical images (e.g., seismic images). FIG. 1 shows a plot of a gather generated by hydrophones in a marine survey. The swell noise can be identified in FIG. 1 as vertical stripes. Swell noise adversely effects seismic data quality and may be severe enough to suspend a survey.

Typical industry solutions for swell noise attenuation use overlapping local time-space ("t-x") windows that cover the entire input seismic gather section. The windows are filtered independently and then merged to construct the output seismic gather section. Each window is mapped to the frequency-space ("f-x") domain and processed in two stages. The first stage is the detection of swell noise locations in the f-x spectrum and the second stage is removal of noise by interpolation using a projection/prediction error filter ("PEF") (see e.g., "Signal-preserving random noise attenuation by the f-x projection," by R. Soubaras, *SEG Expanded Abstracts* 13, pp. 1576-1579, 1994). Swell noise detection is often the computational bottleneck and any improvement in the detection of swell noise improves the performance of noise detection and filtering. A potential problem with the current industry's solutions to remove swell noise is that all of the local data windows work independently. There is no coordination between data windows in terms of noise detection. In other words, when a given trace in a data window is considered noisy, there is no guarantee that the same trace that falls in an adjacent window will also be considered noisy, which contradicts the fact that swell noise typically contaminates an entire trace from time zero to the end of the record. Such inconsistency in the swell noise detection is the main cause of signal distortion, where large signal amplitude (e.g. direct arrival) is often mistakenly considered as swell noise because it has locally strong amplitude.

While detection of swell noise may be improved by increasing the dimensions of the data window, such as increasing the number of traces and the number of samples in each trace (i.e., more statistics and larger spectral amplitudes), the filtering performance using f-x prediction or any other models is not necessarily improved. Because both the detection step and the filtering step are done in the same t-x data window, grouping creates a trade-off for the user in terms of parameter setting. Those working in the petroleum industry seek computational systems and methods that accurately detect swell noise in geophysical data so the swell noise can be removed.

DESCRIPTION OF THE DRAWINGS

FIGS. 5A-5B show an example of a method for detecting swell noise in seismic data.

FIGS. 10A-10J show results for detecting swell noise in synthetic hydrophone data.

DETAILED DESCRIPTION

Computational systems and methods for detecting swell noise in a set of seismic data are disclosed. In particular, the systems and methods receive seismic data as input and iteratively generate a signal mask from the seismic data. The seismic data can be generated by hydrophones or geophones. The signal mask can be used to identify traces in the set of seismic data that are contaminated with swell noise and identify frequencies of the contaminated traces that are contaminated with swell noise. Once the traces and frequencies that contain swell noise have been identified, the set of seismic data can be filtered to remove the swell noise contamination.

Figure 1:
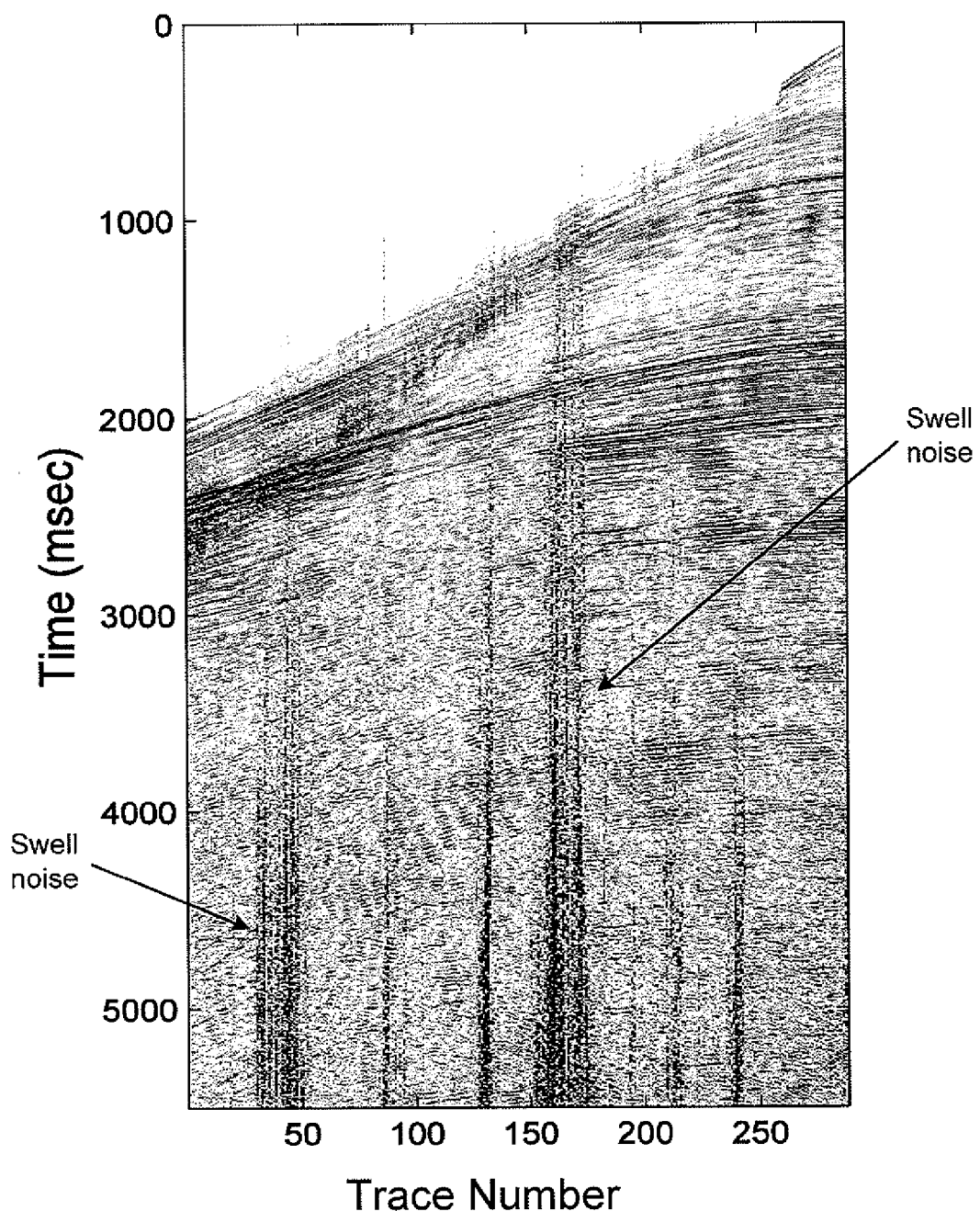
FIG. 1 shows a plot of a gather generated by hydrophones in a marine survey.
Figure 2A:
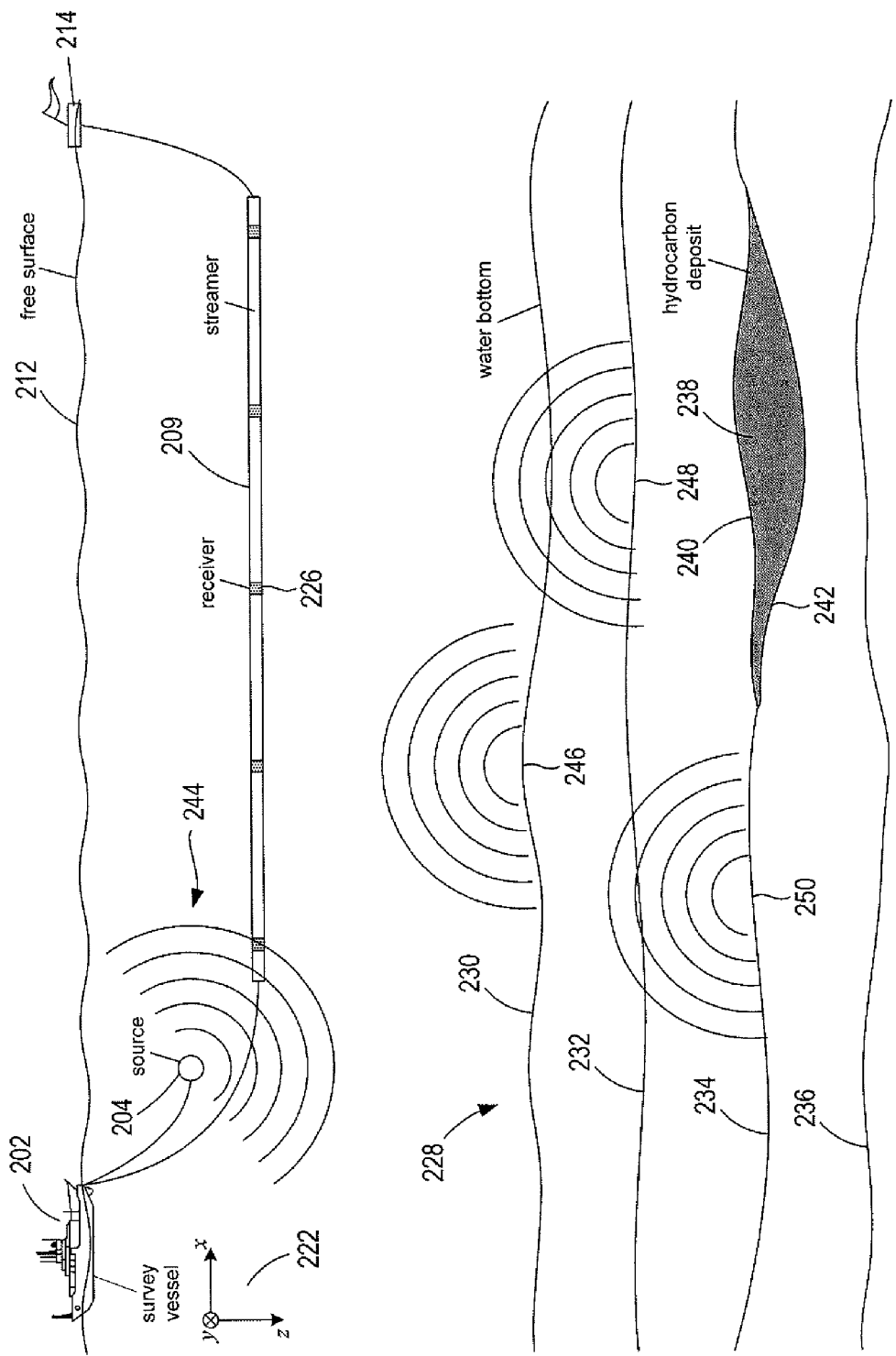
FIGS. 2A-2B show a side-elevation view and a top view, respectively, of a marine seismic data acquisition system.
Figure 2B:
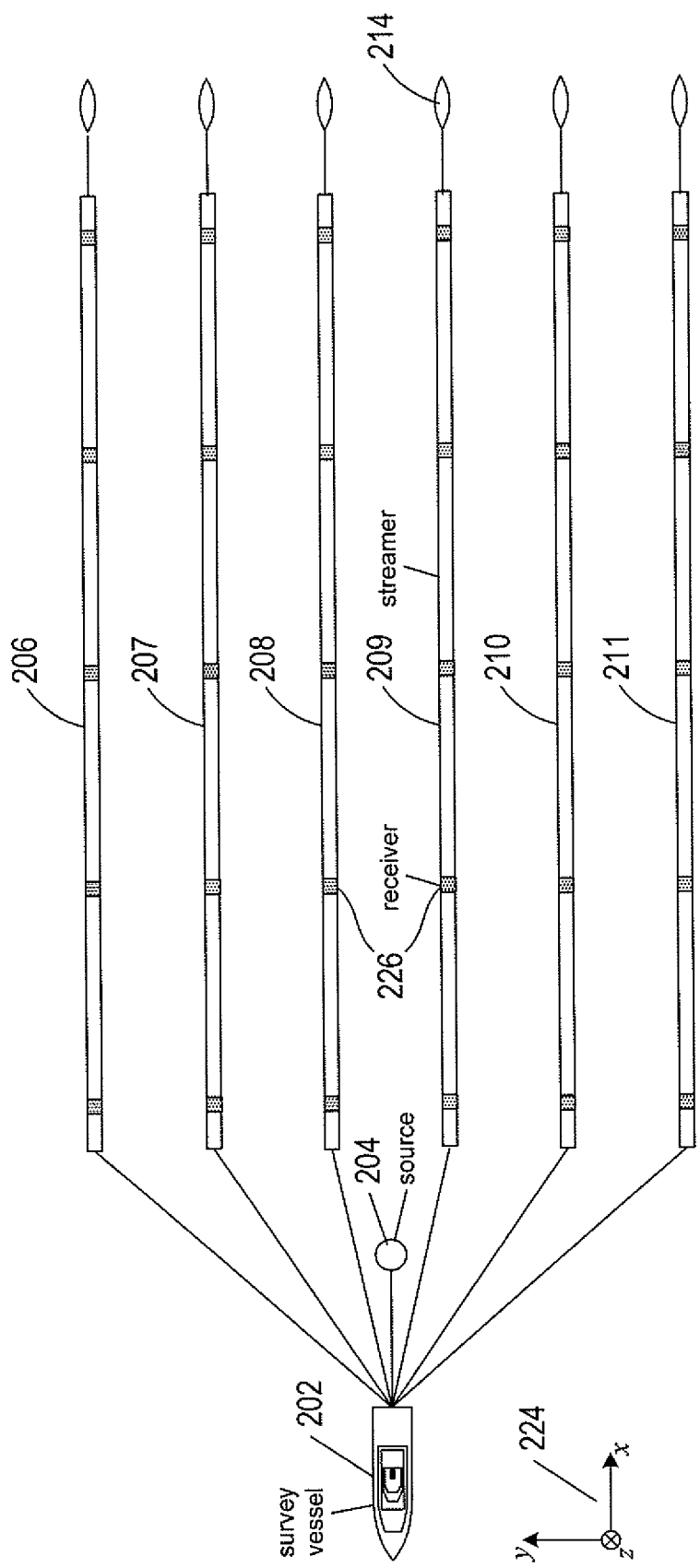

FIGS. 2A-2B show a side-elevation view and a top view, respectively, of a marine seismic data acquisition system composed of an exploration seismology survey vessel 202 towing a source 204 and six separate streamers 206-211 located beneath a free surface 212. In this example, each streamer is attached at one end to the survey vessel 202 via a streamer-data-transmission cable and at the opposite end to a buoy, such as a buoy 214 attached to the steamer 209. In the example of FIGS. 2A-2B, the streamers 206-211 form a planar horizontal receiver acquisition surface located beneath the free surface 212. However, in practice, the receiver acquisition surface can be smoothly varying due to active sea currents and weather conditions. In other words, although the streamers 206-211 are illustrated in FIGS. 2A and 2B as being straight, in practice, the towed streamers may undulate as a result of dynamic conditions of the body of water in which the streamers are submerged. It should be noted that a receiver acquisition surface is not limited to having a horizontal orientation with respect to the free surface 212. The streamers may be towed at depths that orient the receiver acquisition surface at an angle with respect to the free surface 212 or so that one or more of the streamers are towed at different depths. It should also be noted that a receiver acquisition surface is not limited to six streamers. In practice, a receiver acquisition surfaces can be composed of as few as one streamer to as many as 20 or more streamers.

FIG. 2A includes an xz-plane 222 and FIG. 2B includes an xy-plane 224 of the same Cartesian coordinate system having three orthogonal, spatial coordinate axes labeled x, y and z. The coordinate system is used to specify orientations and coordinate locations within a body of water. The x-direction specifies the position of a point in a direction parallel to the length of the streamers and is referred to as the "in-line" direction. The y-direction specifies the position of a point in a direction perpendicular to the x-axis and substantially parallel to the free surface 212 and is referred to as the "cross-line" direction. The z-direction specifies the position of a point perpendicular to the xy-plane (i.e., perpendicular to the free surface) with the positive z-direction pointing downward away from the free surface 212. Streamer depth below the free surface 212 can be estimated at various locations along the streamers using depth measuring devices attached to the streamers. For example, the depth measuring devices can measure hydrostatic pressure or utilize acoustic distance measurements. The depth measuring devices can be integrated with depth controllers, such as paravanes or water kites, that control the depth and position of the streamers as the streamers are towed through a body of water. The depth measuring devices are typically placed at intervals (e.g., about 300 meter intervals) along each streamer. Note that in other embodiments the buoys can be omitted and depth controllers alone can be used to maintain the orientation and depth of the streamers below the free surface 212.

In FIGS. 2A-2B, shaded rectangles 226 represent receivers or sensors that are spaced-apart along the length of each streamer. The streamers 206-211 are long cables containing power and data-transmission lines that connect the receivers 226 to seismic acquisition equipment located on board the survey vessel 202. In one type of exploration seismology, each receiver is a dual sensor including a geophone that detects vertical displacement within the body of water over time by detecting particle motion, velocities or accelerations, and a hydrophone that detects variations in water pressure over time. The streamers 206-211 and the vessel 202 may include sensing electronics and data-processing facilities that allow measurements from each receiver to be correlated with absolute positions on the free surface 212 and absolute three-dimensional positions with respect to an arbitrary three-dimensional coordinate system.

FIG. 2A shows a cross-sectional view of the survey vessel 202 towing the source 204 and streamers above a subterranean formation 228. Curve 230 represents a surface at the bottom of a body of water located above the subterranean formation 228. The subterranean formation 228 is composed of a number of subterranean layers of sediment and rock. Curves 232, 234, and 236 represent interfaces between subterranean layers of different compositions. A shaded region 238, bounded at the top by a curve 240 and at the bottom by a curve 242, represents a hydrocarbon-rich subterranean deposit, the depth and positional coordinates of which may be determined by analysis of seismic data collected during a marine seismic survey. As the survey vessel 202 moves over the subterranean formation 228 the source 204 produces pressure waves at spatial and temporal intervals. In other embodiments, the source may be towed by a separate survey vessel or a number of sources may be towed by a number of different vessels. Source 204 may be an air gun, marine vibrator, or an array of air guns and/or marine vibrators. FIG. 2A illustrates a pressure wave in the form of an acoustic impulse expanding outward from the source 204 as a pressure wavefield 244 represented by semicircles of increasing radius centered at the source 204. The wavefronts are, in effect, shown in vertical plane cross section in FIG. 2A. The outward and downward expanding portion of the pressure wavefield 244 is called the "primary wavefield," which eventually reaches the surface 230 of the subterranean formation 228, at which point the primary wavefield is partially reflect from the surface 230 and partially refracted downward into the solid, subterranean formation 228, becoming elastic waves within the subterranean formation 228. In other words, in the body of water, the acoustic impulse is composed of compressional pressure waves, or P-waves, while in the solid subterranean formation 228, the waves include both P-waves and transverse waves, or S-waves. Within the subterranean formation 228, at each interface between different types of materials or at discontinuities in density or in one or more of various other physical characteristics or parameters, downward propagating waves are partially reflected and partially refracted. As a result, each point of the surface 230 and each point of the interfaces within the underlying subterranean formation 228 becomes a potential secondary point source from which acoustic and elastic wave energy, respectively, may emanate upward toward the receivers 226 in response to the acoustic impulse generated by the source 204 and downward-propagating elastic waves generated from the pressure impulse. As shown in FIG. 2A, secondary waves of significant amplitude are generally emitted from points on or close to the surface 230, such as point 246, and from points on or very close to interfaces in the subterranean formation 228, such as points 248 and 250. Tertiary waves called "receiver ghosts" are produced by secondary waves that are reflected from the free surface 212 back towards the streamers 206-211 and the subterranean formation 228.

The secondary waves are generally emitted at different times within a range of times following the initial acoustic impulse. A point on the surface 230, such as the point 246, receives a pressure disturbance corresponding to the initial acoustic impulse more quickly than a point within the subterranean formation 228, such as points 248 and 250. Similarly, a point on the surface 230 directly beneath the source 204 receives the acoustic impulse sooner than a more distant-lying point on the surface 230. Thus, the times at which secondary and higher-order waves are emitted from various points within the subterranean formation 228 are related to the distance, in three-dimensional space, of the points from the source 204.

Acoustic and elastic waves, however, travel at different velocities within different materials as well as within the same material under different pressures. Therefore, the travel times of the primary wavefield and secondary wavefield emitted in response to the primary wavefield are complex functions of distance from the source 104 as well as the materials and physical characteristics of the materials through which the primary wave travels. In addition, the secondary expanding wavefronts may be altered as the wavefronts cross interfaces and as the velocity of sound varies in the media are traversed by the wave. The superposition of waves emitted from within the subterranean formation 228 in response to the primary wavefield is a generally very complicated wavefield that includes information about the shapes, sizes, and material characteristics of the subterranean formation 228, including information about the shapes, sizes, and locations of the various reflecting features within the subterranean formation 228 of interest to exploration seismologists.

Each hydrophone and/or geophone of a receiver 226 generates seismic data called a "trace." A trace is a recording of a subterranean formation response to acoustic energy that passes from the source 204, through subterranean layers, and reflected ultimately to a receiver 226. In particular, a trace is a record of a time-dependent amplitude that represents acoustic energy in the secondary wavefield measured by a hydrophone or geophone. A secondary wavefield typically arrives first at the receiver 226 located closest to the source 204. The distance between the source 204 and each receiver induces a delay in the arrival time of a secondary wavefield from a substantially horizontal interface within the subterranean formation.

Figure 3:
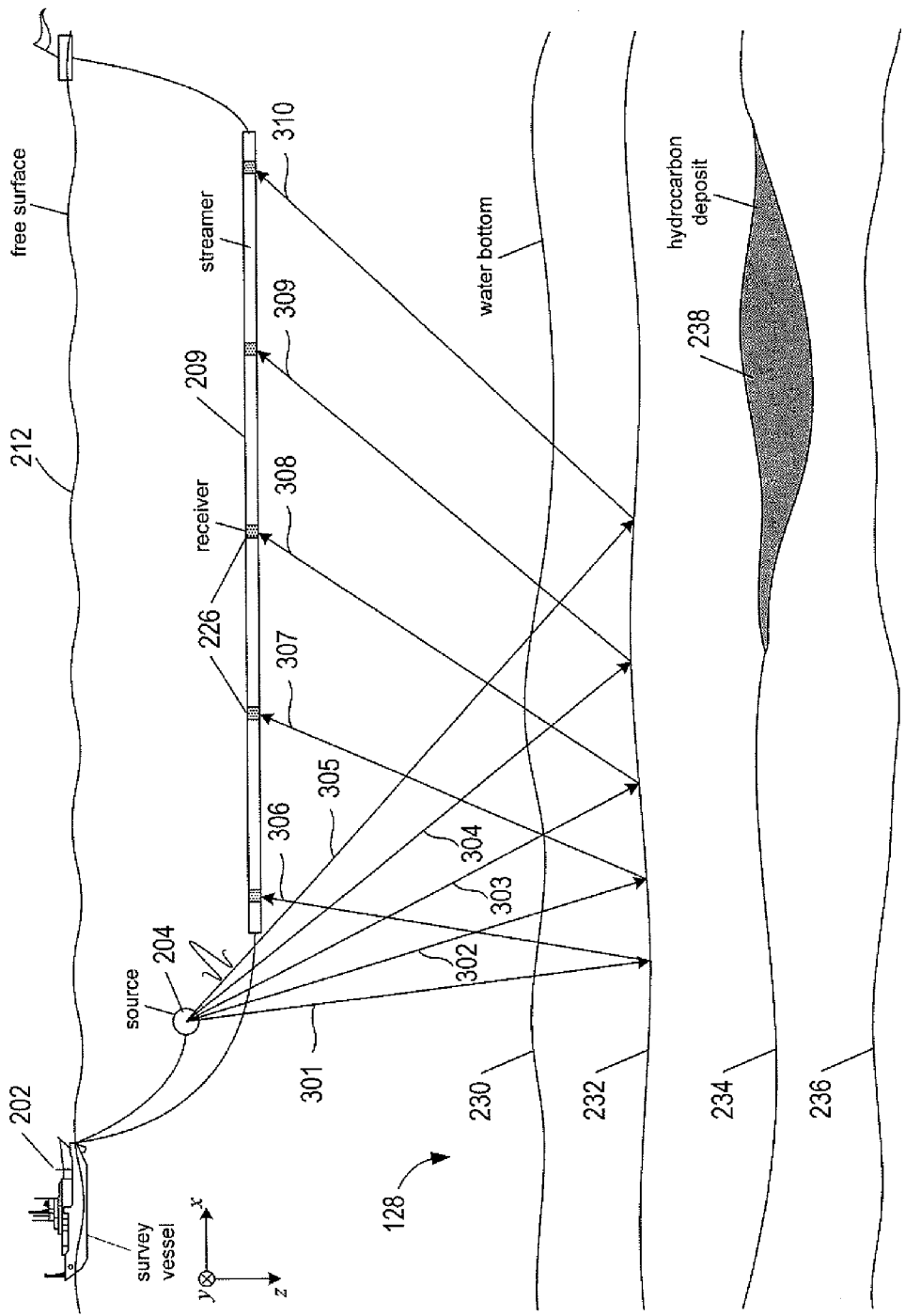
FIG. 3 shows ray paths for acoustic impulses that travel from a source to an interface of a subterranean formation and ultimately to receives.
Figure 4C:
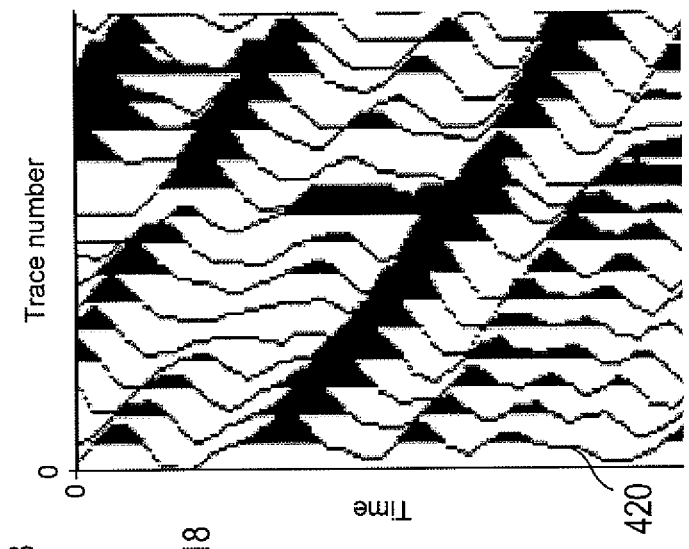
FIG. 4C shows a gather of fifteen traces recorded over a period of time.
Figure 4B:
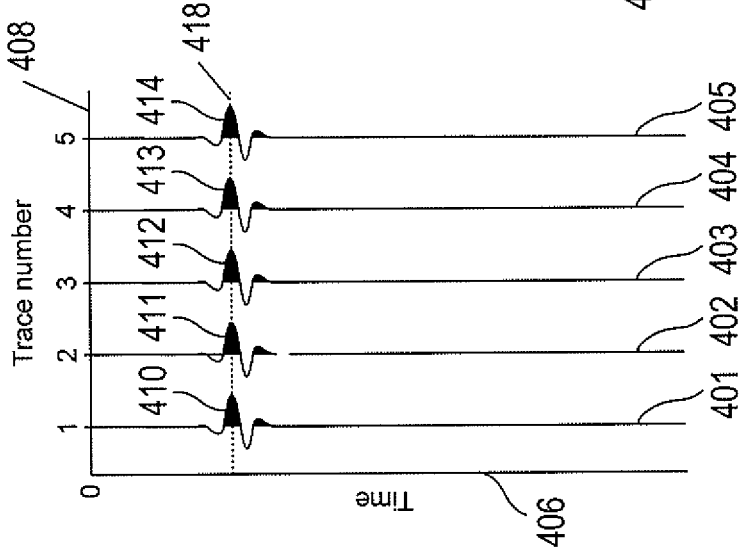
FIG. 4B shows an example gather of five traces after normal moveout.
Figure 4A:
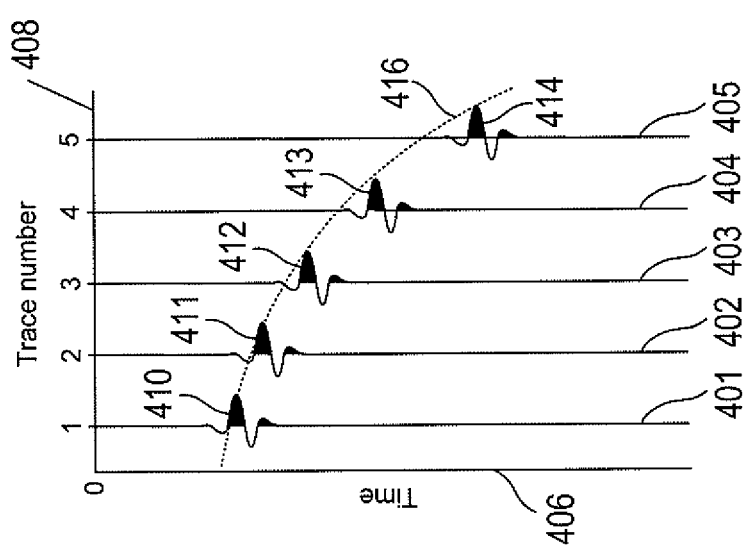
FIG. 4A shows an example gather of five traces.

FIG. 3 shows ray paths 301-304 that represent paths of the primary wavefield that travels from the source 204 to interact with the interface 232. Rays 306-310 represent the paths of acoustic energy reflected off of the interface 232 (i.e., secondary wavefields) to the receivers 226 located along the streamer 209. Each of the receivers 226 measures the acoustic energy associated with a path from the source 204 to the interface 232 and finally to a receiver, which generates a corresponding trace. FIG. 4A shows a plot, called a "gather," of example traces 401-405 associated with the five receivers 226 detecting the acoustic energy reflected from the substantially horizontal interface 232. Vertical axis 406 represents time and horizontal axis 408 represents trace numbers with trace "1" represents the seismic data generated by the receiver located closest to the source 204 and trace "5" represents the seismic data generated by the receiver located farthest from the source 204. The example traces include pulses 410-414 that represent arrival of acoustic energy at the receivers 226 reflected from the interface 232. Peaks, colored black, and troughs of each trace represent movement measured by the hydrophone and geophone, in which the vertical axis of a trace is the travel time of the acoustic energy, and the amplitude of the peak or trough indicates the magnitude of acoustic energy recorded by the hydrophone or geophone. Note that the arrival times versus source-receiver offset is longer with increased source-receiver offset and, in this example, has a hyperbolic shape 416. The traces from different source-receiver pairs can be corrected during seismic data processing to remove the effects of different source-receiver offsets in a process called "normal moveout" ("NMO"). FIG. 4B shows a gather of the traces 410-414 after NMO has been applied to align the pulses in time as represented by horizontal line 418. After NMO corrections, traces from different shot records with a common reflection point can be stacked to form a single trace during seismic data processing. Stacking improves the signal-to-noise ratio, reduces noise, improves seismic data quality, and reduces the amount of data. A typical trace does not represent the data associated with a single reflection from an interface, as represented in FIGS. 4A-4B.

A trace represents the time-dependant amplitude of acoustic energy associated with numerous reflections from the source to the subterranean formation and ultimately to the receiver. FIG. 4C shows a gather of 15 traces recorded over a period of time. Each trace, such as trace 420, has variation in amplitude over time and represents acoustic energy reflected from various interfaces within a subterranean formation as measured by a receiver.

FIGS. 5A-5B show an example of a method for detecting swell noise in seismic data. The seismic data is seismic gather data. FIG. 5A shows an example of a sliding window 502 used to collect subsets of the gather data. The sliding window 502 has a time interval, T, that is less than the total time length of traces comprising a seismic gather and spans the total number of traces, X, that make up the gather. In other words, the sliding window 502 represents a T×X sized sliding data window that is used to assemble subsets of seismic gather data for further processing. An example of using the sliding window 502 to collect subsets of seismic gather data is illustrated in FIG. 5B. Rectangle 504 represents seismic gather data obtained from hydrophones or geophones. Vertical axis 506 represents a time axis and horizontal axis 508 represents trace numbers axis. Each data element of the gather data 504 has a time-domain component t and a spatial-domain component x that represents the trace number (i.e., time-space domain denoted by t-x) and an associated amplitude a(t,x). Rectangle 510 represents the sliding window 502 initialized to time $t_w = t_s$, and the subset of gather data that lies within in the sliding window 510 is given by:

$$G_0 = \{a(t,x) | t_s \leq t \leq t_s + T; \text{ all } x\} \quad (1)$$

where $t_s$ is the start time of a swell-noise detection zone within the gather data.

The sliding window is incrementally stepped through the seismic gather data 504 with a time step, t', that is less than T. For example, the subset of gather data that lies within the next sliding window position represented by rectangle 512 is given by:

$$G_1 = \{a(t,x) | t_s + t' \leq t \leq t_s + t' + T; \text{ all } x\} \quad (2)$$

Because the time step t' is less than T, the subsets $G_0$ and $G_1$ intersect (i.e., $G_0 \cap G_1 \neq \emptyset$), as indicated by shaded region 514. In general, the subsets associated with the sliding window 502 incrementally stepped through the seismic gather data 504 is given by:

$$G_j = \{a(t,x) | t_s + jt' \leq t \leq t_s + jt' + T; \text{ all } x\} \quad (3)$$

where
j=0, 1, 2, ... M; and
$G_j \cap G_{j+1} \neq \emptyset$.

The sliding window is incrementally stepped through the gather data until the end of the gather data 504 is reached, as represented by rectangle 516.

At each step of the sliding window along the gather data 504, the subset of gather data that lies within the sliding window is computationally processed to generate a corresponding local signal mask that lies in the frequency-spatial domain denoted by f-x. In the example of FIG. 5B, the f-x domain is composed of a range of frequencies from 0 to a selected frequency $f_{max}$ and the entire range of traces x. As shown in FIG. 5B, the subset of gather data $G_0$ that lies in the sliding window 510 is processed 518 to generate a local signal mask 520, and the subset of gather data $G_1$ that lies in the sliding window 512 is processed 522 to generate a local signal mask 524. The subset of gather data $G_M$ that lies in the final sliding window 516 is processed 526 to generate a local signal mask 528. Block 530 represents the computational processes executed in order to generate a local signal mask from a subset of the gather data 504. Block 530 includes computing the frequency-offset (f-x) power spectrum 532 of a subset of gather data followed by applying noise detection 534 to the resulting power spectrum, on a frequency slice basis to produce a local signal mask. Computing the power spectrum 532 includes transforming the amplitudes a(t, x) associated with a trace in the t-x domain to the f-x domain. The transformation can be represented mathematically by:

$$D(f, x) = \sum_{n=0}^{N-1} a(t_n, x) e^{-ift_n} \quad (4)$$

where $t_n$ is the nth time amplitude in the interval $t_s+jt' \leq t_n \leq t_s+jt'+T$; and f represents a frequency.

In other words, D(f,x) is the Fourier transform of the xth trace in the subset $G_j$. In practice, a fast Fourier transform ("FFT") can be used for computational speed and efficiency. After each trace in the subset $G_j$ has been transformed, the power spectrum is given by:

$$S_j = \{r(f,x)\} \quad (5)$$

where $r(f,x) = |D(f,x)|^2$ is amplitude for x=1, 2, ..., X; and f is in a range of frequencies from 0 to $f_{max}$.

In other words, $S_j$ is the set of power-spectrum values of the subset $G_j$ the traces x=1, 2, ..., X and the range of frequencies.

After a power spectrum $S_j$ has been calculated in block 532 for a subset $G_j$, noise detection 534 is applied to the power spectrum $S_j$ to generate the corresponding local signal mask. Noise detection 534 uses a threshold value, Thrs, to distinguish with amplitudes r(f,x) that include swell noise from amplitudes r(f,x) composed of mostly signal. For each amplitude r(f,x) in the power spectrum $S_j$, elements of the local signal mask, $L_j$, are determined as follows:

$$L_j(f, x) = \begin{cases} \theta & r(f, x) \geq Thrs \\ \phi & r(f, x) < Thrs \end{cases} \quad (6)$$

where θ and φ are numbers with the condition that θ≠φ. For example, suppose θ=1 and φ=0. When the amplitude r(f,x) is less than the threshold Thrs the amplitude of the local signal mask element $L_j(f,x)$ is assigned the value "0" and when the amplitude r(f,x) is greater than or equal to the threshold Thrs the amplitude of the local signal mask element $L_j(f,x)$ is assigned the value "1." When a local signal masks $L_j$ is generated from a power spectrum $S_j$ the local signal mask is combined 536 with previously generated local signal masks in a process called accumulation. Accumulation 536 is a process where after each local signal mask $L_j$ is generated from an associated power spectrum $S_j$, the local signal mask $L_j$ is added to an accumulation of previously determined local signal masks $L_0, \ldots, L_{j-1}$. For example, elements of an accumulated local signal mask, denoted by $L_{acc}(f,x)$, can be initialized by:

$$L_{acc}(f,x) = L_0(f,x) \quad (7)$$

After a local signal mask $L_j$ is generated from a power spectrum $S_j$ as described above, elements of the accumulated signal mask can be updated by:

$$L_{acc}(f,x) = L_j(f,x) + L_{acc}(f,x) \quad (8)$$

for each coordinate (f,x). After the final local signal mask $L_M$ 528 has been generated for a power spectrum $S_M$ and accumulated according to Equation (8), the amplitude of each element L(f,x) of the accumulated signal mask $L_{acc}(f,x)$ is divided by the total number of local signal masks, M+1, to obtain the average local signal mask $L_{ave}$, with element calculated by:

$$L_{ave}(f, x) = \frac{1}{M+1} L_{acc}(f, x) \quad (9)$$

A final signal mask $F_{SM}$ 538 is generated for each coordinate (f,x) as follows:

$$F_{SM}(f, x) = \begin{cases} \mu & L_{ave}(f, x) \geq \eta \\ \nu & L_{ave}(f, x) < \eta \end{cases} \quad (10)$$

where

μ and ν are real numbers; and

η is a threshold value used to identify frequencies and traces contaminated with swell noise.

For example, μ=1 and ν=0 and the threshold η can be assigned the value 0.5. FIG. 5B shows an example of a final signal mask 538 with shaded regions 540-542 that represent coordinates (f,x) where $F_{SM}(f,x)=1$ and remaining unshaded regions that represent coordinates (f,x) where $F_{SM}(f,x)=0$. The frequencies f and traces x associated with shaded regions 540-542 are contaminated with swell noise.

Two techniques for generating the threshold Thrs used to calculate a local signal mask $L_j$ from the power spectrum $S_j$ represented in Equation (6) are now described. One technique for determining a threshold Thrs is to use a user-selected threshold factor that is multiplied by a statistical measure of the power spectrum $S_j$. In other words, the threshold is computed by:

$$Thrs = \alpha \hat{s}(S_j) \quad (11)$$

where $\hat{s}(S_j)$ is a statistical measure of the power spectrum $S_j$; and

α is a positive valued factor, called the "threshold factor."

The statistical measure $\hat{s}(S_j)$ can be the median, mean, root-mean-square value of any percentile of the power spectrum $S_j$. The statistical measure can be selected based on the distribution of the amplitudes comprising the spectrum $S_j$. The threshold value Thrs is an upper-bound on the possible values of the signal amplitudes and any value greater than Thrs is considered swell noise.

A second technique for determining the threshold Thrs is based on a method for detecting outliers described in "High-amplitude noise detection by the expectation-maximization algorithm with application to swell-noise attenuation," by M. Bekara and M. Van der Baan, *Geophysics*, 75, no. 3, V39-V49 (2010) and is summarized as follows. The amplitudes r(f,x) in the power spectrum $S_j$ are assumed to be independent and identically distributed. The objective is to find the amplitudes r(f,x) with different statistical properties (i.e., outliers) than other amplitudes r(f,x) in the power spectrum $S_j$. For example, the outliers have large amplitudes (i.e., signal plus swell noise) as compared to other amplitudes which are primarily composed of signal. The population of outliers differs from that of other amplitudes in the power spectrum $S_j$ in terms of some distinguishing statistical measures that can be captured using probability density function ("PDF") modeling. The PDF of the outliers is denoted by $p(r|\theta_1)$ and that of the regular amplitudes by $p(r|\theta_0)$ with $\theta_1 \neq \theta_0$. The PDF for the power spectrum $S_j$ is structured as a mixture of the two models as follows:

$$g(r|\theta_0, \theta_1, \epsilon) = \epsilon p(r|\theta_1) + (1-\epsilon) p(r|\theta_0) \quad (12)$$

where $\epsilon$ represents the fraction of outliers in the power spectrum $S_j$ and has the statistical meaning of being an a priori probability that the amplitude r is drawn at random from the power spectrum $S_j$ is an outlier. The a posteriori probability that a given amplitude $r_i$ is an outlier can be computed using Bayes' rule:

$$Pr\{r \text{ is an outlinear}| r = r_i\} = \frac{\epsilon p(r_i|\theta_1)}{\epsilon p(r_i|\theta_1) + (1-\epsilon) p(r_i|\theta_0)} \quad (13)$$

The value $r_i$ is considered an outlier when its a posteriori probability is greater than a probability threshold given by:

$$Pr\{r \text{ is an outlier}|r=r_i\} > \beta \quad (14)$$

where $\beta$ is the probability threshold value. The choice of the probability threshold $\beta$ is more objective than the choice of the threshold factor $\alpha$ and reflects the statistical confidence to classify any amplitude as an outlier. An example of a PDF for outliers is given by an exponential probability distribution:

$$p(r|\lambda) = \frac{1}{\lambda} \exp(-r/\lambda) \quad (15)$$

where $r \geq 0$ and $\lambda$ is the mean value of the exponential distribution. The model given in Equation (12) then becomes $$g(r|\lambda_0, \lambda_1, \epsilon) = \frac{1-\epsilon}{\lambda_0} \exp(-r/\lambda_0) + \frac{\epsilon}{\lambda_1} \exp(-r/\lambda_1) \quad (16)$$

where $\lambda_1 > \lambda_0$ reflects the fact that large amplitudes are more likely to be generated by the distribution of outliers. The three unknown parameters $(\lambda_0, \lambda_1, \epsilon)$ can be estimated from the power spectrum $S_j$ using the maximum-likelihood estimator obtained by solving the optimization problem:

$$(\hat{\lambda}_0, \hat{\lambda}_1, \hat{\epsilon}) = \arg\max_{\lambda_0, \lambda_1, \epsilon} J(\lambda_0, \lambda_1, \epsilon) \quad (17)$$

where $$J(\lambda_0, \lambda_1, \epsilon) = \prod_{i=1}^{X} g(r_i|\lambda_0, \lambda_1, \epsilon) \quad (18)$$

Because no closed form solution exists for Equation (17), the expectation-maximization ("EM") method can be used to find maximum-likelihood estimates $(\hat{\lambda}_0, \hat{\lambda}_1, \hat{\epsilon})$ of the model's parameters $(\lambda_0, \lambda_1, \epsilon)$.

Figure 6:
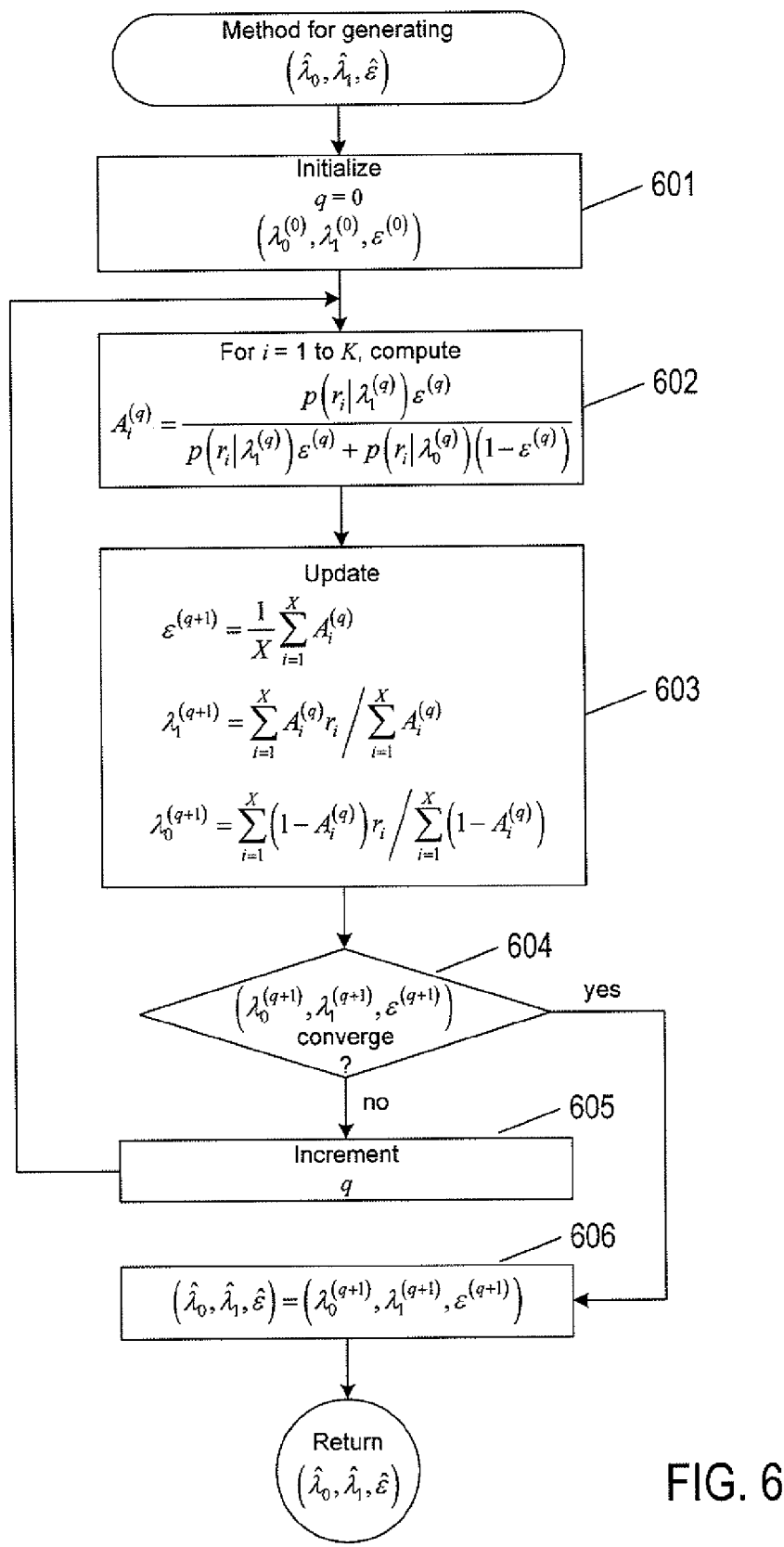
FIG. 6 shows a flow-control diagram for an iterative expectation-maximization method for calculating parameter estimates.

An iterative EM method for calculating the estimates $(\hat{\lambda}_0, \hat{\lambda}_1, \hat{\epsilon})$ is presented in FIG. 6. In block 601, q is assigned the value "0" and initial conditions are set for $(\lambda_0^{(0)}, \lambda_1^{(0)}, \epsilon^{(0)})$. For example, $\epsilon^{(0)} = 0.1$, $\lambda_1^{(0)}$ equals the mean of $[\epsilon^{(0)}n]$ largest amplitudes, and $\lambda_0^{(0)}$ the mean of the remaining data. In block 602, the a posteriori probability, denoted by $A_i^{(q)}$ and described above with reference to Equation (13), the amplitude $r_i$ is an outlier is calculated for $i = 1, 2, \ldots, X$. In block 603, the parameters $(\lambda_0^{(q+1)}, \lambda_1^{(q+1)}, \epsilon^{(q+1)})$ are updated. In block 604, when the parameters $(\lambda_0^{(q+1)}, \lambda_1^{(q+1)}, \epsilon^{(q+1)})$ do not converge, the method proceeds to block 605, otherwise, when the parameters converge, the method proceeds to block 606. Convergence in block 604 can occur when all three of the parameters satisfy the condition:

$$|J(\lambda_0^{(q)}, \lambda_1^{(q)}, \epsilon^{(q)}) - J(\lambda_0^{(q+1)}, \lambda_1^{(q+1)}, \epsilon^{(q+1)})| < \delta_0 \quad (19)$$

where $\delta_0$ is a small number between "0" and "1." In block 605, q is incremented and the operations in blocks 602-604 are repeated. In block 606, the estimated parameters $(\hat{\lambda}_0, \hat{\lambda}_1, \hat{\epsilon})$ are assigned the parameters $(\lambda_0^{(q+1)}, \lambda_1^{(q+1)}, \epsilon^{(q+1)})$ Equations (13), (15), and (16) are combined and the unknown parameters $(\lambda_0, \lambda_1, \epsilon)$ are replaced by the estimates $(\hat{\lambda}_0, \hat{\lambda}_1, \hat{\epsilon})$ to obtain an amplitude-based threshold detection criterion:

$$Thrs = \frac{\hat{\lambda}_1}{\frac{\hat{\lambda}_1}{\hat{\lambda}_0} - 1} \left[ \log\left(\frac{1-\hat{\epsilon}}{\hat{\epsilon}}\right) + \log\left(\frac{\beta}{1-\beta}\right) + \log\left(\frac{\hat{\lambda}_1}{\hat{\lambda}_0}\right) \right] \quad (20)$$

An amplitude r is an outlier with probability $\beta$, when r>Thrs. The threshold in Equation (20) takes into account the statistics of the power spectrum and a user's confidence requirement through the value of $\beta$. A user's influence on the threshold of Equation (20) is minimized when $\beta = 0.5$. When the value for $\beta$ is increased, the statistical confidence to accept outliers increases and consequently increases the threshold.

Once the final signal mask is computed, only frequencies and traces contaminated with swell noise are filtered. Filtering can be performed using a small t-x domain filter data window that slides with overlap both in time and space to cover the entire section of gather data. The final signal mask can be used to select an optimal filter data window size (i.e., number of traces) for filtering each frequency contaminated with swell noise:

$$TR_{opt}(f) = \max(2 TR_{max}(f), TR_{default}) \quad (21)$$

where $TR_{max}(f)$ is the maximum number of clustered traces contaminated with swell noise at each frequency f; and $TR_{default}$ is a user selected input value.

For example, $TR_{default}$ can be between "5" and "10." Equation (21) is used to determine the optimum number of traces, denoted by $TR_{opt}(f)$, for a sliding, filter data window used to filter frequencies contaminated with swell noise.

Figure 7:
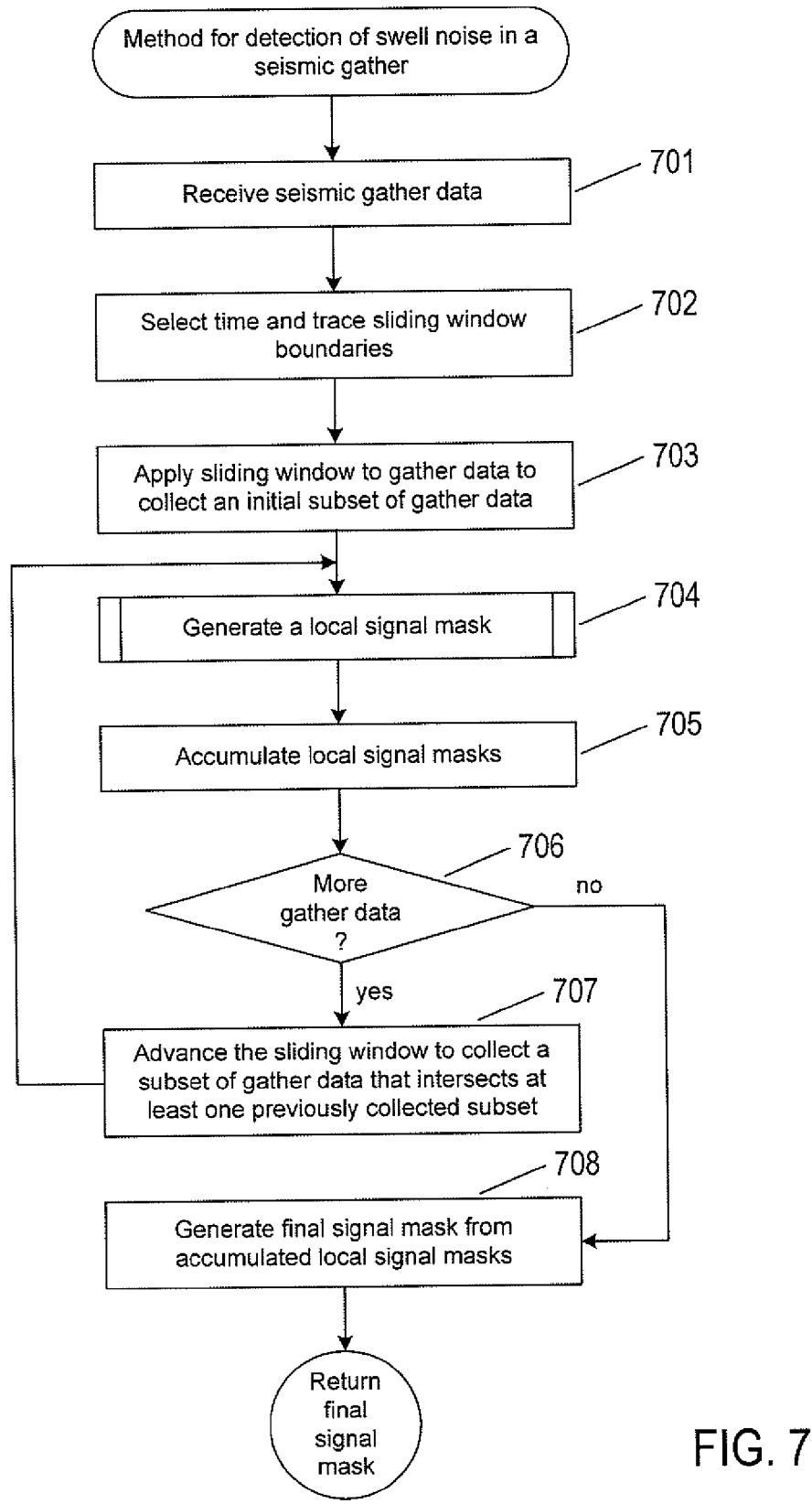
FIG. 7 shows a flow-control diagram of a method for detecting swell noise in seismic data.
Figure 8:
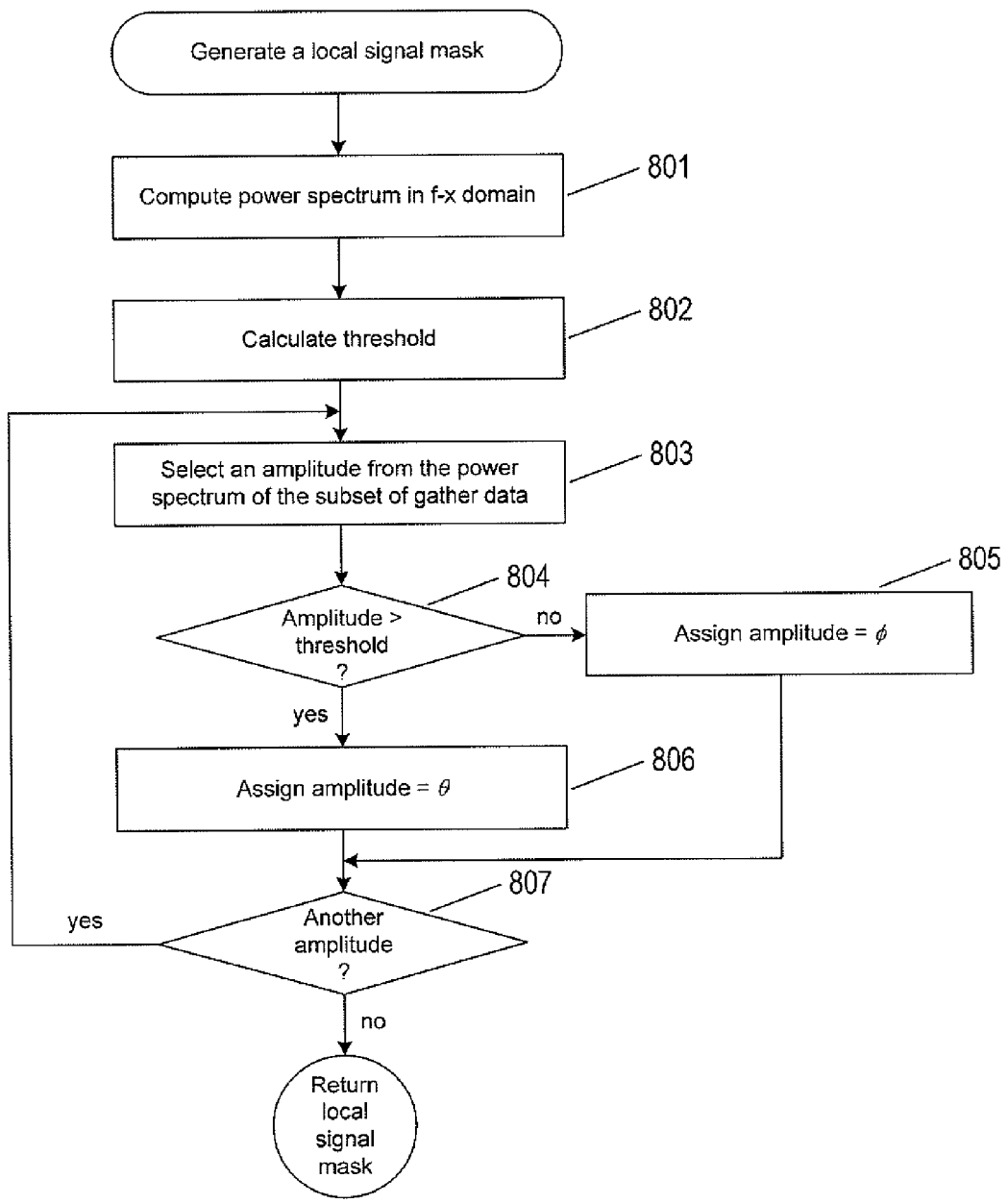
FIG. 8 shows a flow-control diagram for a method of generating a local signal mask called in block 704 of the flow-control diagram of FIG. 8.

FIG. 7 shows a flow-control diagram of a method for detecting swell noise in seismic gather data. In block 701, seismic data generated by hydrophones or geophones located along a streamer towed by a survey vessel is received and collected in a seismic gather. In block 702, time and trace boundaries for a sliding window are selected as described above with reference to FIGS. 5A and 5B. In block 703, the sliding window is applied to the seismic gather data to collect an initial subset of the gather data. For example, the initial subset of the gather data can be $G_0$ and $G_{0,0}$ described above, depending on the type of dimensions of the sliding window. In block 704, a routine "generate a local signal mask," described below with reference to FIG. 8, is called to receive the subset of gather data collected in block 703 and output a corresponding local signal mask. In block 705, the local signal mask output from the routine called in block 704 is accumulated as described above with reference to Equations (7) and (8). In block 706, when more gather data is available, the method proceeds to block 707, otherwise, the method proceeds to block 708. In block 707, the sliding window is advanced to collect a subset of gather data that intersects at least one previously collected subset of gather data, as described above with reference to FIGS. 5A and 5B. For example, the sliding window can be advance to collect a next subset of seismic gather data where the next subset of seismic gather data intersects a previous subset of seismic gather data shown in FIGS. 5A and 5B and represented by Equations (3) and (24). After the next subset of gather data has been collected, the method repeats the operations of blocks 704-706 for the subset of gather data collected in block 707. In block 708, a final signal mask is generated from the accumulated local signal mask as described above with reference to Equations (9) and (10). The frequencies and traces contaminated with swell noise can be identified in the final signal mask by the value of the amplitude assigned. For example, as described above with reference to Equations (9) and (10), the frequencies and traces contaminated with swell noise have amplitudes of "1" and the other amplitudes are "0."

FIG. 8 shows a flow-control diagram of a method for generating a local signal mask called in block 704 of the flow-control diagram of FIG. 7. In block 801, the power spectrum for the subset of gather data collected in step 703 of FIG. 7 is computed in the f-x domain, as described above with reference block 532 in FIG. 5B and to Equations (4) and (5). In block 802, a threshold Thrs is calculated as described above with reference to Equation (11) or as described above with reference to Equation (20) with parameter estimates ($\hat{\lambda}_0$, $\hat{\lambda}_1$, $\hat{\epsilon}$) calculated according to the method illustrated in FIG. 6. In block 803, an amplitude r(f,x) is selected from the power spectrum. In block 804, when the amplitude r(f,x) is less than the threshold Thrs the method proceeds to block 805 and the amplitude is assigned the value $\phi$. On the other hand, when the amplitude r(f,x) is greater than or equal to the threshold Thrs the method proceeds to block 806 and the amplitude is assigned the value $\theta$. In practice, $\theta$ and $\phi$ are numbers with the condition that $\theta \neq \phi$. In block 807, when not all of the amplitudes in the power spectrum have been selected, the method repeats the operations in blocks 803-806, otherwise the local signal mask is returned.

Figure 9:
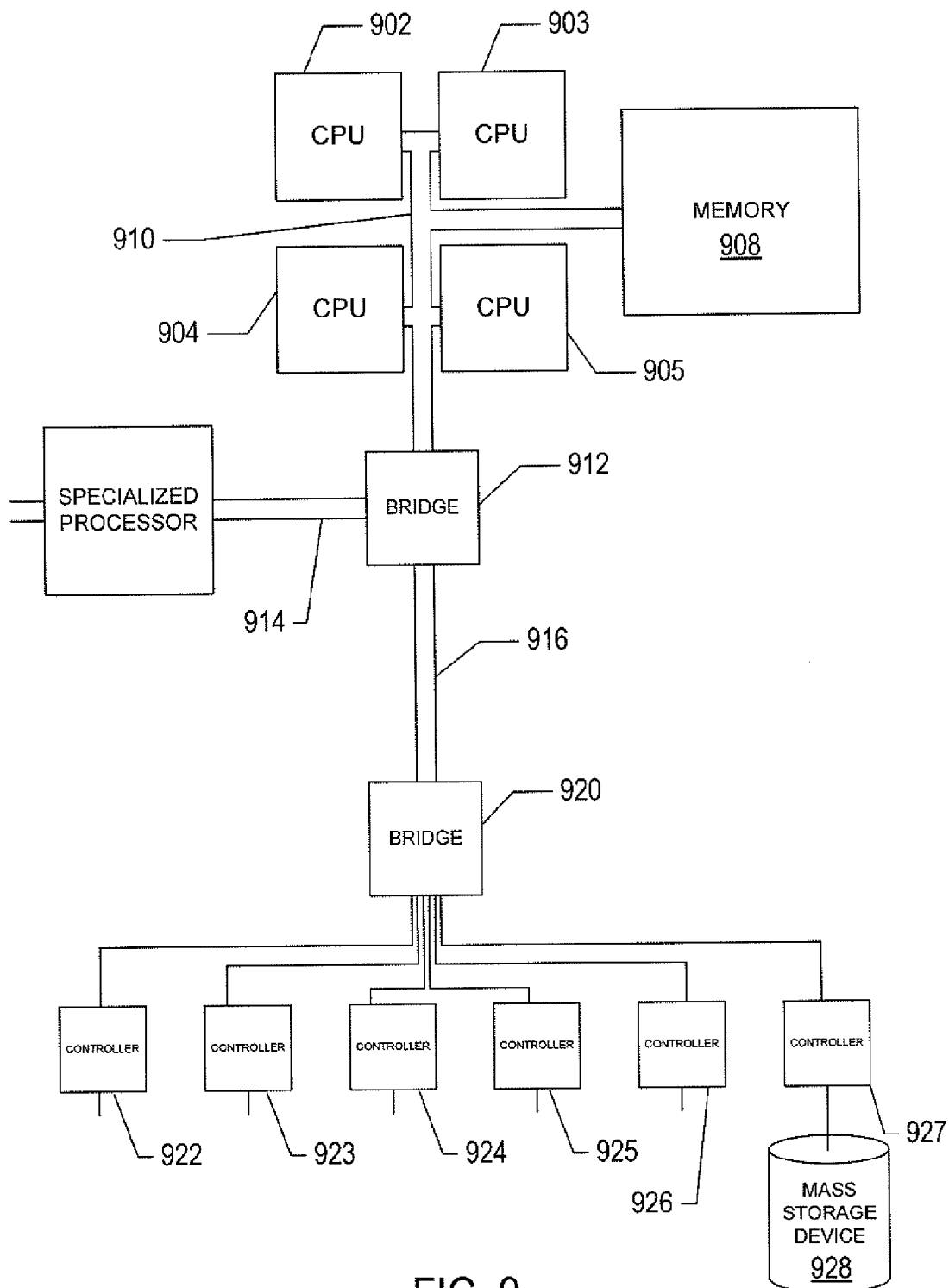
FIG. 9 shows an example of a generalized computer system.

FIG. 9 shows an example of a generalized computer system that executes efficient methods for detecting swell noise in seismic gather data and therefore represents a geophysical-analysis data-processing system. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 902-905, one or more electronic memories 908 interconnected with the CPUs by a CPU/memory-subsystem bus 910 or multiple busses, a first bridge 912 that interconnects the CPU/memory-subsystem bus 910 with additional busses 914 and 916, or other types of high-speed interconnection media, including multiple, high-speed serial interconnects. The busses or serial interconnections, in turn, connect the CPUs and memory with specialized processors, such as a graphics processor 918, and with one or more additional bridges 920, which are interconnected with high-speed serial links or with multiple controllers 922-927, such as controller 927, that provide access to various different types of computer-readable media, such as computer-readable medium 928, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 928 is a non-transitory data-storage device, including electronic memory, optical or magnetic disk drive, USB drive, flash memory and other such data-storage device. The computer-readable medium 928 can be used to store machine-readable instructions that encode the computational methods described above and can be used to store encoded data, during store operations, and from which encoded data can be retrieved, during read operations, by computer systems, data-storage systems, and peripheral devices.

The data-processing systems and methods described above produce a geophysical data product, which is the one or more non-transitory, computer-readable media that also includes the results of the computation methods describes above recorded thereon. The geophysical data product may also include instructions for transferring the data stored thereon to another computer-readable medium for further processing. The geophysical data product may be produced offshore (i.e. by data-processing equipment on a survey vessel) or onshore (i.e. at a data-processing facility on land) either within the United States or in another country. When the data product is produced offshore or in another country, it may be imported onshore to a facility in the United States. Once onshore in the United States, geophysical analysis may be performed on the data product.

RESULTS

Figure 10A:
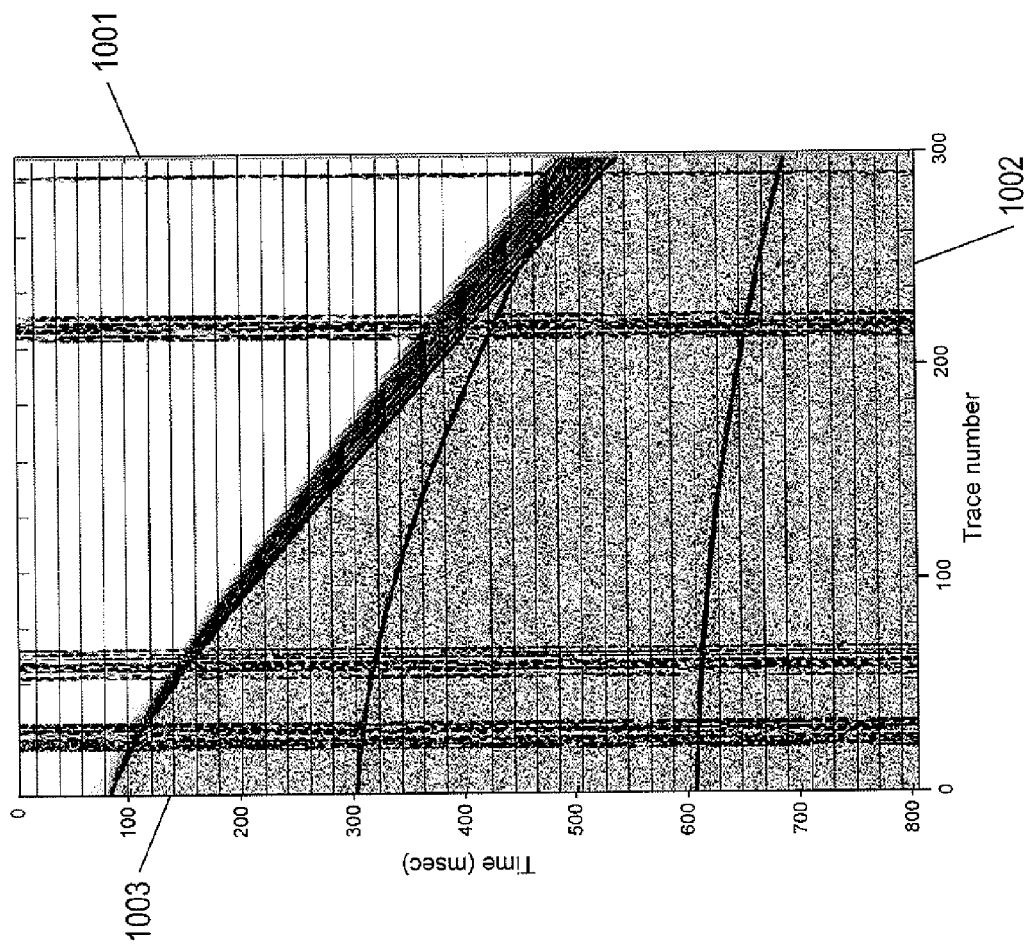
Figures 10B, 10C:
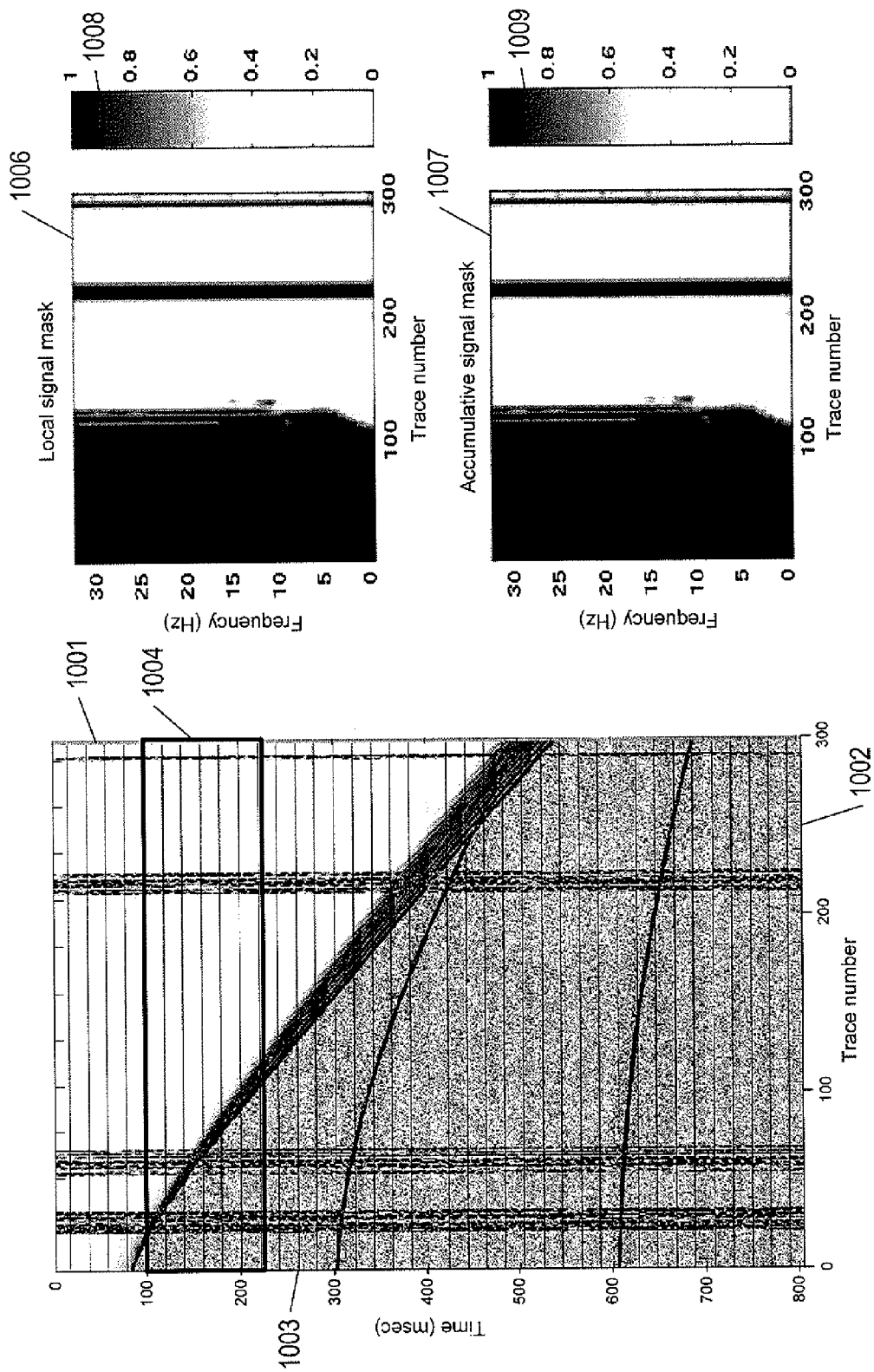
Figures 10F, 10G:
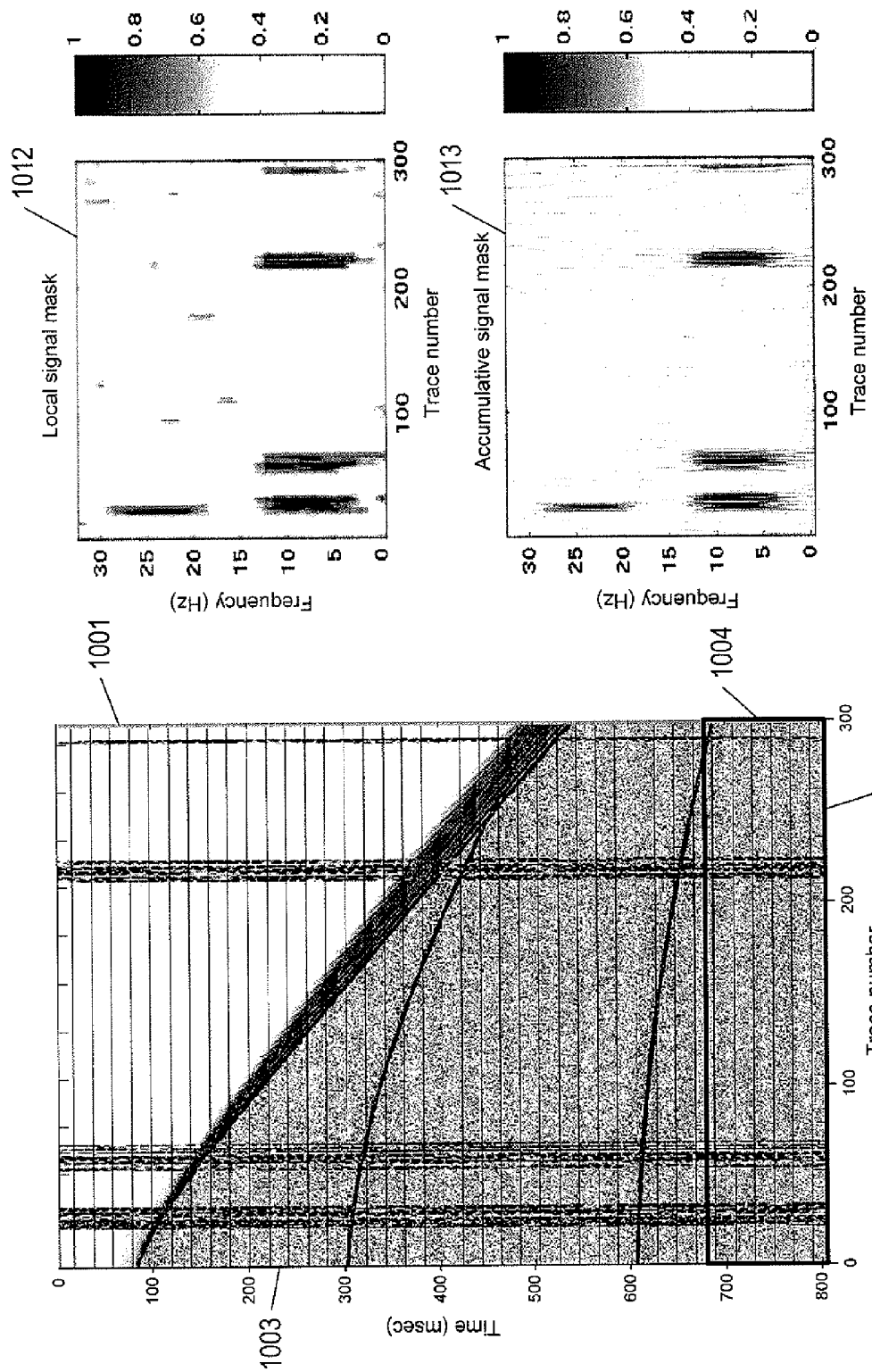
Figure 10J:
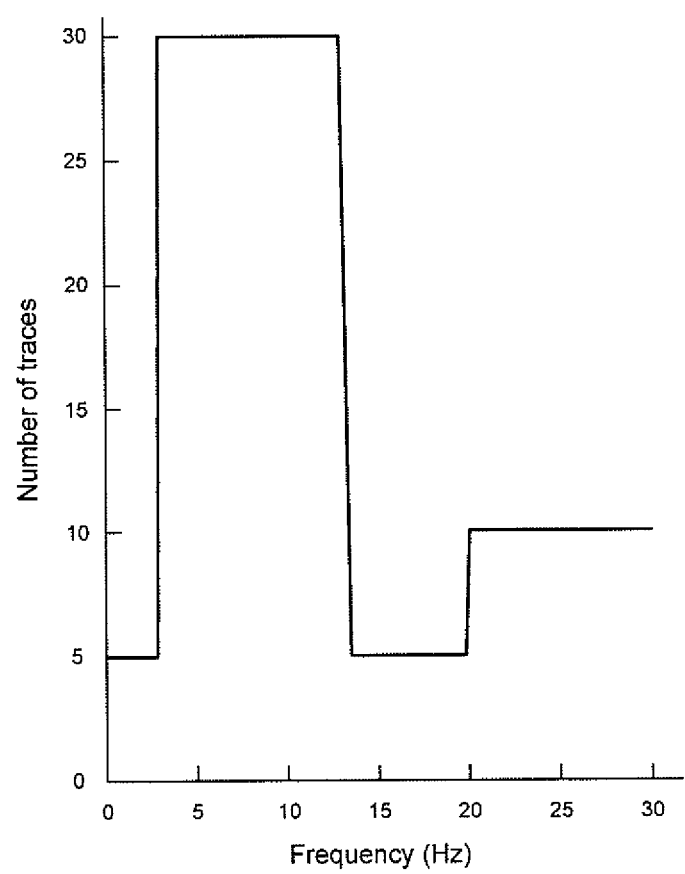

FIGS. 10A-10I show results for detecting swell noise in synthetic hydrophone data using the systems and methods described above. FIG. 10A shows a plot of a gather 1001 of synthetic hydrophone data. Horizontal axis 1002 represents trace numbers and vertical axis 1003 represents time. The gather data was generated for 300 traces and for about 800 milliseconds. FIG. 10B shows an example of a sliding window 1004 with dimensions of about 125 msec by 300 traces. FIG. 10C shows a plot 1006 of the local signal mask of the gather data in the sliding window 1004 shown in FIG. 10B, and plot 1007 shows an accumulative signal mask associated with the sliding window 1004 and previously sliding window locations in the gather 1001. The amplitudes in the local and accumulative signal mask 1006 and 1007, and subsequent local and accumulative signal mask, are represented by accompanying gray scales 1008 and 1009, where "1" represents amplitudes that are greater than the threshold and "0" represents amplitudes that are less than the threshold. The threshold was calculated using Equation (19). FIG. 10D shows an example of the sliding window 1004 farther down the gather. FIG. 10E shows a plot 1010 of the local signal mask of the gather data in the sliding window 1004 shown in FIG. 10D, and plot 1011 shows an accumulative signal mask associated with the location of the sliding window 1004 in FIG. 10D and previous sliding windows. FIG. 10F shows an example of the slide window 1004 at the end of the gather 1001. FIG. 10G shows a plot 1012 of the local signal mask of the gather data in the sliding window 1004 shown in FIG. 10F, and plot 1013 shows an accumulative signal mask associated with the location of the sliding window 1004 in FIG. 10F and previous sliding window locations. FIG. 10H shows an accumulated signal mask obtained from stepping the sliding window through the gather 1001. The accumulated signal mask was processed as described above with reference to Equation (10) with $\mu=1$ and $\nu=0$ and the threshold $\eta=0.5$ to obtain the final signal mask plotted in FIG. 10I. Note that the final signal mask clearly shows five dark patches 1014-1018 that identify frequencies and traces contaminated with swell noise. For example, dark patch 1016 indicates that frequencies between about 1-16 Hz in traces 60-70 are contaminated with swell noise. FIG. 10J shows a plot of the optimal number of traces $TR_{opt}(f)$ versus a range of frequencies for a filter data window. The maximum number of traces, $TR_{max}(f)$ described above in Equation (21), is 15 and a value of "5" was given to $TR_{default}$. Therefore, in accordance with Equation (21), the optimum number of traces for a filter data window used to filter frequencies and traces contaminated with swell noise is 30.

Embodiments described above are not intended to be limited to the descriptions above. For example, any number of different computational-processing-method implementations that carry out the methods described above for detecting swell noise may be designed and developed using various different programming languages and computer platforms and by varying different implementation parameters, including control structures, variables, data structures, modular organization, and other such parameters. The computational representations of wavefields, operators, and other computational objects may be implemented in different ways. The systems and methods for detecting swell noise in seismic gather data can be executed in near-real time while conducting a marine survey of a subterranean formation. The term "near-real time" refers to a time delay due to data transmission and data processing that is short enough to allow timely use of the processed data during further data acquisition. For example, near-real time can refer to a situation in which the time delay due to transmission and processing is insignificant. In other words, near-real time approximates real time when the time for data transmission and data processing appears imperceptible. Near-real time can also refer to a perceptible time delay for data transmission and data processing but the time delay is not so long that quality control cannot be executed.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for detecting swell noise using a programmable computer programmed to perform the operations of:
   receiving seismic data from receivers towed through a body of water;
   incrementally advancing a sliding window through the seismic data, wherein each incremental advancement of the sliding window includes:
      collecting a subset of the seismic data that lies within the sliding window;
      generating a local signal mask from the subset;
      generating an accumulated signal mask from the local signal mask; and
   computing a final signal mask from the accumulated signal mask, wherein the final signal mask identifies frequencies and traces of the seismic data contaminated with swell noise.

2. The method of claim 1, wherein the sliding window is a time interval by trace interval data window in which the time interval is less than the seismic data length of time.

3. The method of claim 1, wherein collecting the subset of seismic data further comprises the subset intersects a previously collected subset of seismic data.

4. The method of claim 1, wherein generating a local signal mask from the subset further comprises:
   transforming the subset from a time-space domain to a frequency-space domain;
   generating a power spectrum of the subset in the frequency-space domain;
   computing a threshold from the power spectrum;
   assigning amplitudes in the power spectrum that are greater than the threshold a first value; and
   assigning amplitudes in the power spectrum that are less than the threshold a second value.

5. The method of claim 1, wherein generating the accumulated signal mask further comprises adding the local signal mask to a previously accumulated local signal mask.

6. The method of claim 1, wherein incrementally advancing the sliding window such that the subset that lies within the sliding window intersects at least one previously collected subset of the seismic data.

7. The method of claim 1, wherein computing a final signal mask from the accumulated signal mask further comprises:
   dividing each amplitude of the accumulated signal mask by the total number of local signal masks to form an average signal mask;
   assigning each amplitude in the average signal mask that is greater than a threshold a first value; and
   assigning each amplitude in the average signal mask that is less than a threshold a second value, wherein the frequency and trace of each amplitude assigned the first value is contaminated with swell noise.

8. The method of claim 1, wherein receiving seismic data, incrementally advancing the sliding window, and computing a final signal mask in near-real time.

9. The method of claim 1 further comprises calculating an optimum number of traces for a filter data window based on a range of contaminated frequencies identified in the final signal mask.

10. A computer system for detecting swell noise in seismic data, the computer system comprising:
   one or more processors;
   one or more computer-readable media; and
   a routine stored in one or more of the one or more data-storage devices and executed by the one or more processors, the routine directed to:
      incrementally advancing a sliding window through seismic data, wherein each incremental advancement of the sliding window includes:
         collecting a subset of the seismic data that lies within the sliding window;
         generating a local signal mask from the subset;
         generating an accumulated signal mask from the local signal mask;
      computing a final signal mask from the accumulated signal mask, wherein the final signal mask identifies frequencies and traces of the seismic data contaminated with swell noise; and
      recording the final signal mask in the one or more computer-readable media.

11. The system of claim 10, wherein the sliding window is a time interval by trace interval data window in which the time interval is less than the seismic data length of time.

12. The system of claim 10, wherein collecting the subset of seismic data further comprises the subset intersects a previously collected subset of seismic data.

13. The system of claim 10, wherein generating a local signal mask from the subset further comprises:
   transforming the subset from a time-space domain to a frequency-space domain;

generating a power spectrum of the subset in the frequency-space domain;
computing a threshold from the power spectrum;
assigning amplitudes in the power spectrum that are greater than the threshold a first value; and
assigning amplitudes in the power spectrum that are less than the threshold a second value.

14. The system of claim 10, wherein accumulating the local signal mask to form the accumulated signal mask further comprises adding the local signal mask to a previously accumulated local signal mask.

15. The system of claim 10, wherein incrementally advancing the sliding window such that the subset that lies within the sliding window intersects at least one previously collected subset of the seismic data.

16. The system of claim 10, wherein computing a final signal mask from the accumulated signal mask further comprises:
dividing each amplitude of the accumulated signal mask by the total number of local signal masks to form an average signal mask;
assigning each amplitude in the average signal mask that is greater than a threshold to a first value; and
assigning each amplitude in the average signal mask that is less than a threshold to a second value, wherein the frequency and trace of each amplitude assigned the first value is contaminated with swell noise.

17. The system of claim 10, further comprises receiving the seismic data from receivers towed through a body of water and incrementally advancing the sliding window and computing the final signal mask in near-real time.

18. The system of claim 10 further comprises calculating an optimum number of traces for a filter data window based on a range of contaminated frequencies identified in the final signal mask.

19. A non-transitory computer-readable medium having machine-readable instructions encoded thereon for enabling one or more processors of a computer system to perform the operations of
retrieving seismic data from one or more data storage devices;
collecting subsets of the seismic data, wherein each subset intersects at least one other subset of the seismic data;
generating a local signal mask from each subset; and
computing a final signal mask from an accumulation of the local signal masks, wherein the final signal mask identifies frequencies and traces of the seismic data contaminated with swell noise.

20. The medium of claim 19, wherein collecting the intersecting subset further comprises incrementally advancing a sliding window through the seismic data, wherein each incremental advancement of the sliding window contains a subset of the seismic data that intersects a previously collected subset of seismic data.

21. The medium of claim 19, wherein generating the local signal mask from each subset further comprises: for each subset,
transforming the subset from a time-space domain to a frequency-space domain;
generating a power spectrum of the subset in the frequency-space domain;
computing a threshold from the power spectrum;
assigning amplitudes in the power spectrum that are greater than the threshold a first value; and
assigning amplitudes in the power spectrum that are less than the threshold a second value.

22. The medium of claim 19, wherein computing a final signal mask from the local signal masks further comprises:
combining the local signal masks to form an accumulated signal mask;
dividing each amplitude of the accumulated signal mask by the total number of local signal masks to form an average signal mask;
assigning each amplitude in the average signal mask that is greater than a threshold a first value; and
assigning each amplitude in the average signal mask that is less than a threshold a second value, wherein the frequency and trace of each amplitude assigned the first value is contaminated with swell noise.

23. The medium of claim 19 further comprises calculating an optimum number of traces for a filter data window based on a range of contaminated frequencies identified in the final signal mask.

24. A method for generating a geophysical data product, the method comprising:
obtaining seismic data; and
processing the seismic data using a programmable computer that is programmed to generate the geophysical data product, wherein the processing includes
collecting subsets of the seismic data, wherein each subset intersects at least one other subset of the seismic data;
generating a local signal mask from each subset;
computing a final signal mask from an accumulation of the local signal masks, the final signal mask identifies frequencies and traces of the seismic data contaminated with swell noise; and
recording the final signal mask in one or more computer-readable media to generate the geophysical data product.

25. The method of claim 24, further comprises performing geophysical analysis onshore on the data product.

26. The method of claim 24, wherein processing the seismic data further comprises processing the seismic data in near-real time on board a survey vessel.

* * * * *